Patented Aug. 13, 1929.

1,724,045

UNITED STATES PATENT OFFICE.

KARL SCHIRMACHER, OF HOCHST-ON-THE-MAIN, BERTHOLD STEIN, OF ELBERFELD, AND KONRAD STENGER, OF FRANKFORT-ON-THE-MAIN, GERMANY, ASSIGNORS TO GENERAL ANILINE WORKS, INC., OF NEW YORK, A CORPORATION OF DELAWARE.

BIS-AMINOARYL ANTHRONE AND ANTHRACENE DERIVATIVES.

No Drawing. Application filed July 21, 1926, Serial No. 124,096, and in Germany July 30, 1925.

Our invention relates to the manufacture of new anthraquinone derivatives by heating an anthraquinone or a substitution derivative thereof with a salt of an aromatic amine. Two series of anthraquinone derivatives may be obtained in this manner, namely, bis-amino-arylanthrones and bis-amino-arylanthracenes, their quantity varying according to the conditions of the reaction. When the conditions are not very drastic the products are mainly bis-aminoarylanthrones which are readily diazotizable. The present invention relates to bis-aminoarylanthrones having the following probable general formula:

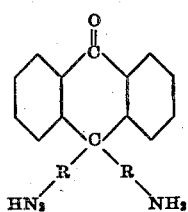

wherein R stands for an aromatic nucleus which may be substituted and in which the anthraquinone nucleus may be substituted by a substituent of the group consisting of alkyl and amino, the first member of the series being probably represented by the following formula:

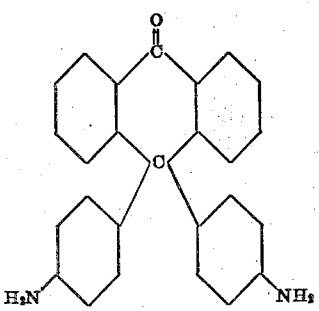

When the conditions are more drastic bis-aminoarylanthracenes, probably of the formula:

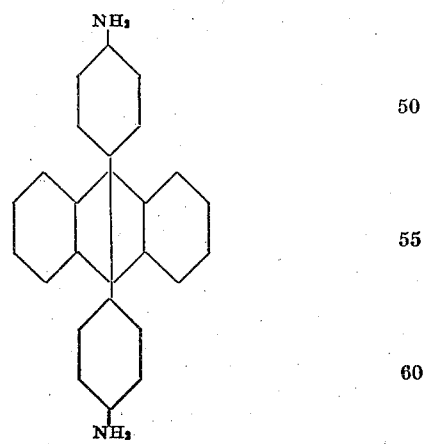

are produced to an increasing extent and finally constitute the main product. For producing the bis-aminoarylanthrones it is preferable to operate at a temperature below 180° C. and to continue the reaction for a comparatively short time, whereas for producing the bis-aminoarylanthracenes temperatures above 185° C. may usefully be employed. The temperatures named are not to be regarded as constants, since they may be varied accordingly as the time occupied by the reaction is diminished or increased. We have furthermore found that the above described 9.9-bis-aminoarylanthrones are converted into 9.10-bis-aminoarylanthracenes by heating them with a condensing agent which simultaneously acts as a reducing agent such, for instance, as aniline salts, stannous chloride, or the like. The new derivatives are suitable for use as parent materials in making dyestuffs and other products.

The following examples illustrate our invention; the parts being by weight:—

*Example 1.*—A mixture of 200 parts of anthraquinone, 500 parts of aniline hydrochloride and 1000 parts of aniline is heated in an oil bath while stirring for about three hours, the temperature of the oil bath being 175° C. To the mass excess of alkali is added and any unaltered aniline is removed by distillation with steam. The residue is dissolved in dilute hydrochloric acid, filtered from any unaltered anthraquinone and from the filtrate the new compound is precipitated by addition of alkali, and, after drying, recrystallized from boiling nitrobenzene.

The bis-amino-phenylanthrone obtained in this manner is a grey green crystalline powder, melting at 298° C. It is readily diazotizable and has a tendency to become greenish blue when exposed to air. It is insoluble in water and in the usual solvents of low boiling point, but freely soluble in boiling xylene and nitrobenzene. It dissolves easily to a colourless solution in dilute mineral acids; these solutions also show a tendency to become blue green when exposed to air.

Its diazo and tetrazo solutions readily yield dyestuffs with coupling components.

If in the foregoing example ortho-toluidine hydrochloride is substituted for the aniline hydrochloride, there is obtained bis-orthoaminotolylanthrone, in the form of a brown powder, melting at 255° C. It is readily diazotizable, its properties closely resemble those of the aniline derivative and its salts, both in substance and in solution, have a tendency to become reddish when exposed to air. In like manner there may be prepared from ortho-anisidine hydrochloride the bis-orthoaminoanisilanthrone.

If in the foregoing example there is used, instead of anthraquinone, 1-aminoanthraquinone, there is obtained bis-aminophenyl-1-aminoanthrone. It crystallizes from boiling xylene in brown red prisms which decompose when they melt. It dissolves in dilute mineral acid freely to a brown red solution. The isomeric bis-aminophenyl-2-aminoanthrone obtained from 2-aminoanthraquinone and aniline hydrochloride crystallizes from boiling xylene in bright yellow crystals which melt while decomposing. It dissolves freely in dilute mineral acids to a bright yellow solution. Other substituted anthraquinone derivatives, such as β-methylanthraquinone and α-chloroanthraquinone yield corresponding derivatives when treated in like manner.

*Example 2.*—The same materials as used in example 1 and in the same proportions are heated together for 1½ hours while stirring, the temperature of the oil bath being 180° C. The mass is worked up in the same manner as in the preceding example.

From the residue which is insoluble in hydrochloric acid, a somewhat impure 9:10-bis-aminophenylanthracene is obtained after unaltered anthraquinone has been removed by vatting.

*Example 3.*—20 parts of anthraquinone, 50 parts of aniline hydrochloride and 100 parts of aniline are heated together in an oil bath, while stirring, for three hours, the internal temperature being about 185° C. and the heating being such that the aniline remains gently boiling. The mass becomes gradually darker and after 1½–2 hours crystals separate from the melt, which has become thick. Heating is continued for another hour, alcohol is added, the whole filtered and the solid matter washed with some alcohol. The crystals thus obtained are the hydrochloride of 9:10-bis-aminophenylanthracene. They are boiled with water, filtered and washed until neutral. This substance crystallizes from pyridine or chlorobenzene in pale yellow leaflets which melt above 300° C. In concentrated sulphuric acid it dissolves to a yellow solution; the colour diminishes on standing or on gently warming and the feebly coloured solution now exhibits a strong blue fluorescence. From the alcoholic filtrate obtained in the operation of working up a small quantity of bis-aminophenylanthrone can still be obtained.

*Example 4.*—20 parts of anthraquinone, 60 parts of orthotoluidine hydrochloride and 100 parts of orthotoluidine are heated together in the oil bath for three hours, while stirring, the internal temperature being about 190° C. The mass is dark and formation of magenta occurs as a secondary reaction. Separation of crystals is not to be observed. The working up is similar to that described in Example 1. The residue consists of a grey brown powder which can be recrystallized with difficulty. It melts above 300° C. It dissolves to a yellow brown solution in concentrated sulphuric acid which soon fades whereupon the slightly coloured solution exhibits a blue fluorescence.

*Example 5.*—20 parts by weight of bis-aminophenylanthrone are heated to strong boiling with 100 parts of hydrochloride of aniline and 200 parts of aniline for about 3 hours while stirring. The molten mass is stirred, while still hot, in an excess of caustic soda solution and the aniline is expelled by means of steam. If required the residue is boiled up with diluted hydrochloric acid in order to remove the unattacked parent material. The final residue consists of crude 9.10-bisaminophenylanthracene.

In the foregoing examples the proportions by weight can be varied within wide limits; instead of the hydrochlorides of aromatic-amines the salts formed by other mineral acids with aromatic amines may be used.

We claim:

1. As new products, the bodies of the general formula:

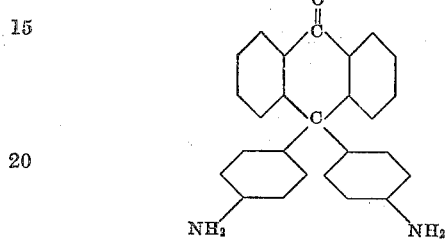

in which the anthraquinone nucleus may be substituted by a substituent of the group consisting of alkyl and amino, which are greyish to brownish powders, are readily diazotizable, whose diazo and tetrazo solutions yield readily azo dyestuffs with coupling components, and which are soluble in concentrated sulfuric acid.

2. As new products, the anthraquinone derivatives having the general formula:

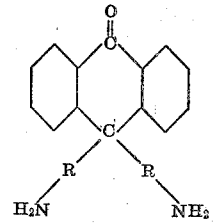

wherein R stands for an aromatic nucleus which may be substituted and in which the anthraquinone nucleus may be substituted by a substituent of the group consisting of alkyl and amino, which products are greyish to brownish powders, are readily diazotizable, whose diazo and tetrazo solutions yield readily azo dyestuffs with coupling components, and which are soluble in concentrated sulfuric acid.

In testimony whereof, we affix our signatures.

KARL SCHIRMACHER.
BERTHOLD STEIN.
KONRAD STENGER.